UNITED STATES PATENT OFFICE.

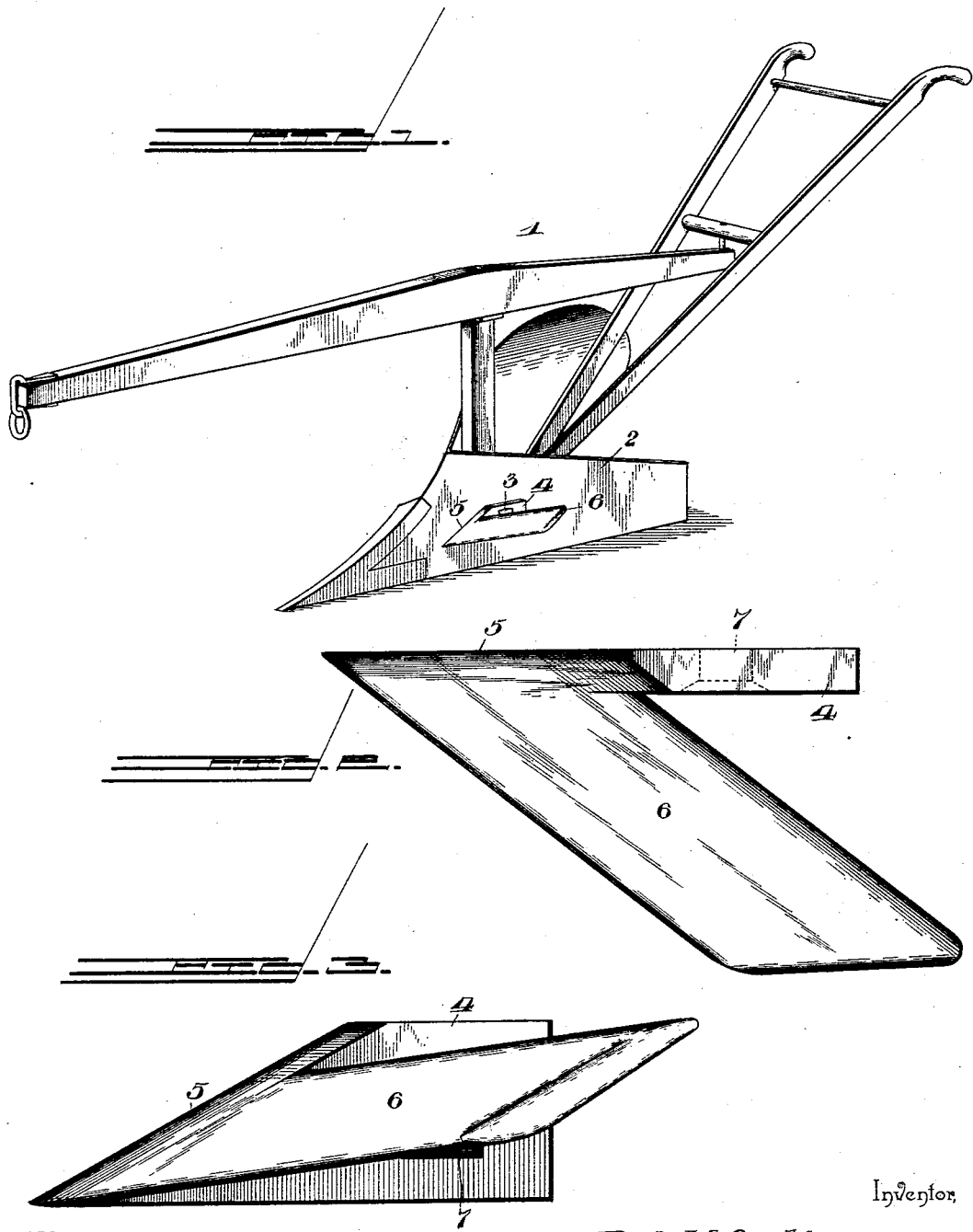

JOEL NICKOLAS COCKS, OF STONY CREEK, VIRGINIA.

PLOW ATTACHMENT.

SPECIFICATION forming part of Letters Patent No. 573,504, dated December 22, 1896.

Application filed December 23, 1895. Serial No. 573,104. (No model.)

*To all whom it may concern:*

Be it known that I, JOEL NICKOLAS COCKS, a citizen of the United States, residing at Stony Creek, in the county of Sussex and State of Virginia, have invented a new and useful Plow Attachment, of which the following is a specification.

This invention relates to plow attachments, and has for its object to provide a simple and inexpensive attachment resembling somewhat a small moldboard and adapted to be applied to the landside by means of the same bolt which secures the plow to the standard. The attachment so applied operates simultaneously with the plow proper, and while the latter is turning the soil and covering the grass in the middle of or between the rows the attachment is operating to cover the grass near the plants, thereby saving one plowing and the necessity for hoeing the crop.

To the above end the invention consists in an improved plow attachment embodying certain novel features of construction, as hereinafter fully described, illustrated in the drawings, and finally pointed out in the claim.

In the accompanying drawings, Figure 1 is a perspective view illustrating the application of the improved attachment to the landside of a plow. Fig. 2 is a plan view of the attachment. Fig. 3 is a side elevation of the same.

Similar numerals of reference designate corresponding parts in the several figures of the drawings.

Referring to the accompanying drawings, 1 designates an ordinary turning-plow, and 2 the landside thereof, which may be formed integrally with or separately from the plowshare and moldboard and secured to the standard by means of a bolt 3 in the ordinary manner.

The improved attachment comprises a vertically-disposed portion 4, having its front portion tapered to a point at the advance end to form an inclined entrance edge 5 for penetrating the soil, and also comprises an obliquely-disposed moldboard 6, arranged at an angle about corresponding to and resembling in appearance the moldboard of an ordinary plow. The advance or active service of the moldboard 6 is inclined or canted in such manner as to lift the soil adjacent to the plants, and the part 6 is also elevated as to its rear end or is given an upward inclination or slant from front to rear for the purpose of lifting the soil and turning the same over for the purpose of covering the grass adjacent to such plants.

The attachment described is applied to the landside of the plow 1 by placing the vertical portion 4 of the attachment flatwise against the landside 2, and such attachment may be held in place by means of the same bolt 3 which secures the landside to the standard, a bolt-hole 7 being formed in the vertical portion 4 for the reception of such bolt. When in position, the attachment has the appearance of a diminutive plowshare.

With the aid of the attachment above described such crops as peanuts, corn, cotton, &c., may be cultivated and the soil thereabout loosened up simultaneously with the turning of the soil into the middle of or between the rows. One entire plowing is thus saved and also the necessity of hoeing the plants. The cultivation of the crops is thus materially cheapened and a considerable amount of time saved, the practical importance of which will be readily appreciated.

Changes in the form, proportion, and minor details of construction may be resorted to without departing from the spirit or sacrificing any of the advantages of this invention.

Having thus described the invention, what is claimed as new is—

The combination with a plow, of a cultivating attachment secured to the landside at a point remote from the bottom edge thereof, said attachment consisting of a vertical body portion having its front end tapered to form an inclined entrance-point, and an inclined or slanting moldboard portion having the same pitch as said entrance-point and extending obliquely to the line of draft, and also inclining upward and rearward from its point of union to the body portion, the two portions of the attachment being united at their front ends in the form of the letter V, substantially as described.

In testimony that I claim the foregoing as my own I have hereto affixed my signature in the presence of two witnesses.

JOEL NICKOLAS COCKS.

Witnesses:
J. F. SLADE,
E. L. COCKS.